United States Patent
Mirabella et al.

(10) Patent No.: US 7,140,665 B2
(45) Date of Patent: Nov. 28, 2006

(54) TEMPERATURE PROTECTION SYSTEM FOR CARGO TRAILERS

(75) Inventors: Peter W. Mirabella, Schereville, IN (US); Matthew M. Moran, Tinley Park, IL (US)

(73) Assignee: Q-Sales & Leasing LLC, Hazel-Crest, IL (US)

( * ) Notice: Subject to any disclaimer, the term of this patent is extended or adjusted under 35 U.S.C. 154(b) by 49 days.

(21) Appl. No.: 11/065,882

(22) Filed: Feb. 25, 2005

(65) Prior Publication Data

US 2006/0192402 A1    Aug. 31, 2006

(51) Int. Cl.
*B60P 7/02* (2006.01)

(52) U.S. Cl. .............. 296/100.11; 296/100.13

(58) Field of Classification Search ........... 296/100.11, 296/100.12, 100.15, 100.18, 24.4, 24.41
See application file for complete search history.

(56) References Cited

U.S. PATENT DOCUMENTS

| | | | | |
|---|---|---|---|---|
| 3,160,436 | A * | 12/1964 | Duddleston ............ | 296/100.12 |
| 4,067,603 | A * | 1/1978 | Fenton ................... | 296/100.13 |
| 4,215,897 | A * | 8/1980 | Aiken et al. ........... | 296/100.11 |
| 4,281,872 | A * | 8/1981 | Biancale ................ | 296/100.13 |
| 4,995,663 | A * | 2/1991 | Weaver et al. ......... | 296/100.11 |
| 5,080,423 | A * | 1/1992 | Merlot et al. .......... | 296/100.13 |
| 5,102,182 | A * | 4/1992 | Haddad, Jr. ............ | 296/100.13 |
| 5,145,230 | A * | 9/1992 | Biancale ................ | 296/100.13 |
| 5,253,914 | A * | 10/1993 | Biancale ................ | 296/100.13 |
| 5,658,037 | A * | 8/1997 | Evans et al. ........... | 296/100.12 |
| 5,938,270 | A * | 8/1999 | Swanson et al. ....... | 296/100.11 |
| 6,007,138 | A * | 12/1999 | Cramaro ................ | 296/100.11 |

* cited by examiner

*Primary Examiner*—Kiran B. Patel
(74) *Attorney, Agent, or Firm*—George H. Gerstman; Seyfarth Shaw LLP

(57) ABSTRACT

A cargo blanket suspension system for a container comprises: a generally flat, horizontal framework of connected bars positioned within a cargo compartment of the cargo container. A cable system is connected to the framework to suspend the framework from or adjacent to the ceiling of the cargo compartment, to support a cargo blanket carried on the framework, and to permit raising and lowering of the framework and cargo blanket.

17 Claims, 6 Drawing Sheets

TEMPERATURE PROTECTION SYSTEM FOR CARGO TRAILERS

BACKGROUND OF THE INVENTION

This invention relates to thermal protective systems to be used in trailers, containers, box cars, and the like. The system has particular application for the maintenance of temperature sensitive cargo, either frozen goods, or goods that need protection from freezing.

Containers, such as cargo containers, trailers, delivery vans, stationary storage containers, railroad cars, and the like, are often constructed of lightweight materials which do not have thermal insulating capabilities. For example, a trailer may have an aluminum sheet metal outer skin and a thin plywood layer on the inside, so as to have low thermal insulation. Other trailers of the "reefer" type may be constructed with a layer of insulating foam positioned typically between an outer layer of aluminum and an inner layer of plastic or stainless steel. Such containers are expensive, and require the use of large amounts of insulation.

Also, cargo has been thermally protected by means of a blanket or quilt that overlies the cargo. For example, large quilts are sold under the trademark CARGO QUILT by Q Sales and Leasing, LLC for this purpose. The quilts are large and thick, and therefore are fairly cumbersome in handling although effective in purpose.

Another way of thermally protecting cargo is by filling the particular cargo container with carbon dioxide. However, numerous problems exist by this method, relating to environmental concerns, damage resulting from pressurizing of the cargo space, and possible injury or fatal consequences to workers upon re-entry into the pressurized, non-oxygen containing atmosphere of the system.

A need exists for a permanent, relatively light weight, thermal protection system that is easily handled, and can be used in any type of cargo container. The need also exists for a thermal protection system such as a quilt that can be stored inside the container when not in use in a convenient, out-of-the-way manner, so that the container can also be used for the shipment of non-thermally sensitive products, if desired, but the quilt can be applied for thermal insulation at any time with great simplicity of application.

DESCRIPTION OF THE INVENTION

By this invention, a cargo blanket suspension system for a container is provided. The system comprises: a generally flat, horizontal framework of connected bars, positioned within a cargo compartment of said container. A cable system is also provided, connected to the framework to suspend the framework from or adjacent to the ceiling of said cargo compartment, to support a cargo blanket carried on the framework, and to permit raising and lowering of the framework and cargo blanket.

Any type of appropriate blanket may be used such as one or more quilts. The blanket can be raised and lowered by the suspension system: raised to permit convenient loading and unloading of the cargo without serious inconvenience due to the presence of the cargo blanket and frame, which may be drawn upwardly near to, and preferably into engagement with, the ceiling of the cargo container. Then, the cargo blanket and frame can be lowered onto the cargo to provide thermal insulation, typically to either keep the product from freezing, or keeping the product frozen, depending on the product.

In some embodiments, the horizontal framework comprises at least one longitudinal bar (or joined bar sections) extending most of the length of the cargo compartment, and a plurality of spaced, transversely extending cross bars attached to the longitudinal bar. The cross bars are also attached at their respective outer ends to cable portions of the cable system.

The cable portions may comprise branching cable portions that connect to at least one main cable portion at ends opposed to their connections with the cross bars. The main cable portion, in turn, may, in some embodiments, connect to a winch, to permit raising and lowering of the frame with said winch and cable system.

It may be desired for at least a pair of main cable portions to connect to the winch by attachment to a single master cable, which is attached to said winch. Thus, the winch, through the master cable, can pull and release a plurality of main cable portions, which comprise the branching cable portions that connect to the cross bars of the framework.

The master cable may be threaded through a pulley system, if desired, to gain mechanical advantage as the winch pulls the master cable to raise the framework and cargo quilt. The master cable in the pulley may extend generally transversely of the length of the cargo compartment, as shown in the specific embodiment.

Optionally, the framework may carry a frame extension, comprising a cantilevered bar assembly attached to a cross bar which is located at an end of the framework. By this means, the framework can be extended by an added distance that is less than the average spacing between the cross bars, so that the overall length of the framework can be precisely adjusted by selection of the extension distance of the cantilevered bar.

It is also desirable in some embodiments for downwardly angled support arms to be attached at outer ends of the cross bars. The cable portions which are attached to the cross bars engage the support arms at lower ends thereof, so that the cross bars are held at a level which is higher than the lower ends of the support arms. By this means, the framework and the blanket can be positioned higher, adjacent to and pressing in contact with the sealing in the retracted, storage position to be out of the way.

If desired, the framework may carry a plurality of blankets rather than a single blanket.

DESCRIPTION OF SPECIFIC EMBODIMENTS

Figure 1:
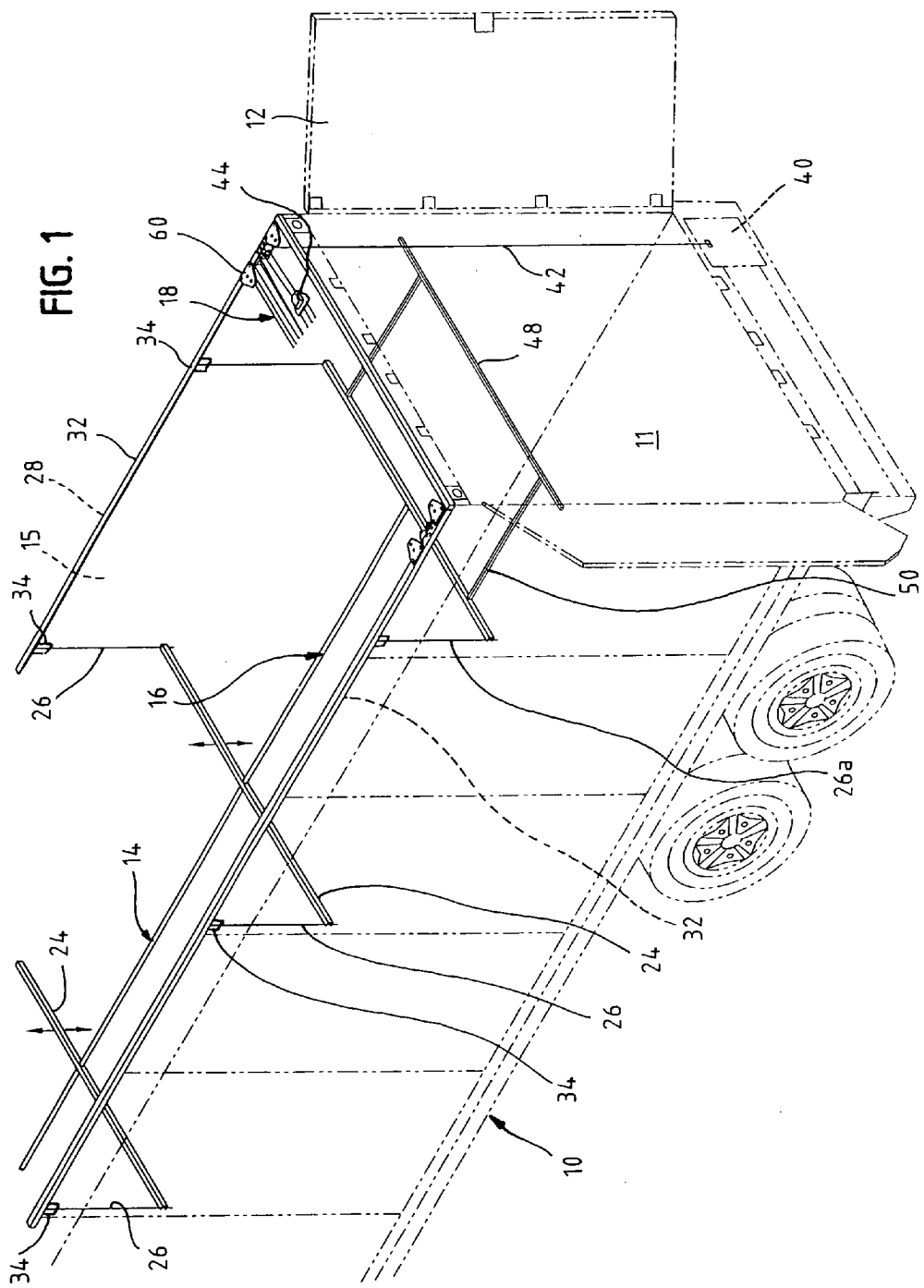
FIG. 1 is a perspective view of a truck trailer, equipped with the cargo blanket suspension system of this invention.

Referring to the drawings, FIG. 1 shows a portion of a truck trailer 10, having a rear entrance door system 12 and inner compartment 11, and having a cargo blanket suspension system 14 mounted within truck trailer 10 and suspending from the ceiling 15 of the inner compartment of the truck trailer, which is present but not shown for clarity of disclosure. Suspension system 14 comprises a generally flat, horizontal framework of connected bars 16, as well as a cable system 18, which extends throughout the interior of trailer 10 and suspends horizontal framework 16 from positions which are at least adjacent to the ceiling 15 of inner compartment 11.

Figure 4:
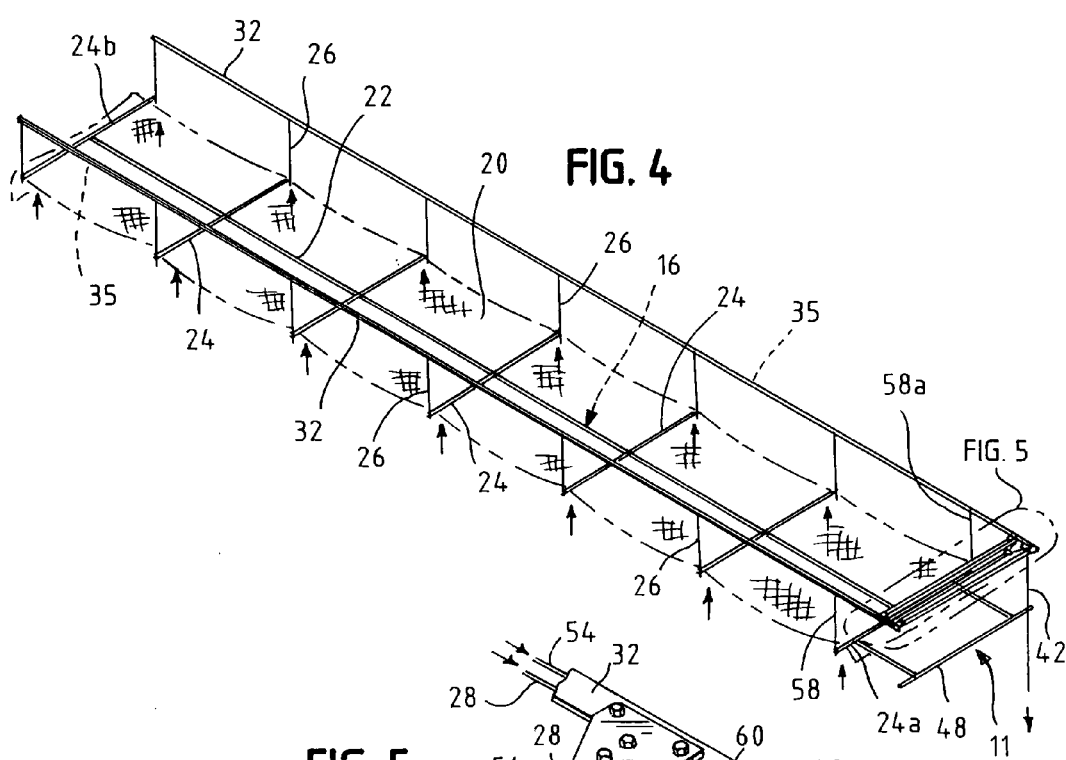
FIG. 4 is a perspective view of the support portion of FIG. 3, adding the generally flat, horizontal framework of connected bars, and cable portions connected to cross bar ends.

As shown in FIG. 4, framework of connected bars 16 supports a cargo blanket 20, which is particularly a quilt, the support being provided by longitudinal bar 22, of framework 16, shown to extend most of the length of truck compartment 11, and a plurality of spaced, connected, transversely extending cross bars 24, which are attached to longitudinal bar 22.

Figure 6:
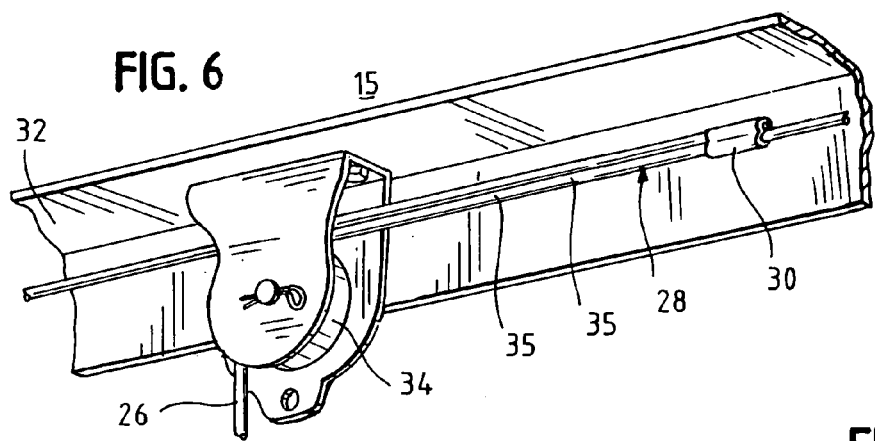
FIG. 6 is a detailed, enlarged, perspective view of a portion of the cable system in conjunction with a portion of the support portion.
Figure 10:
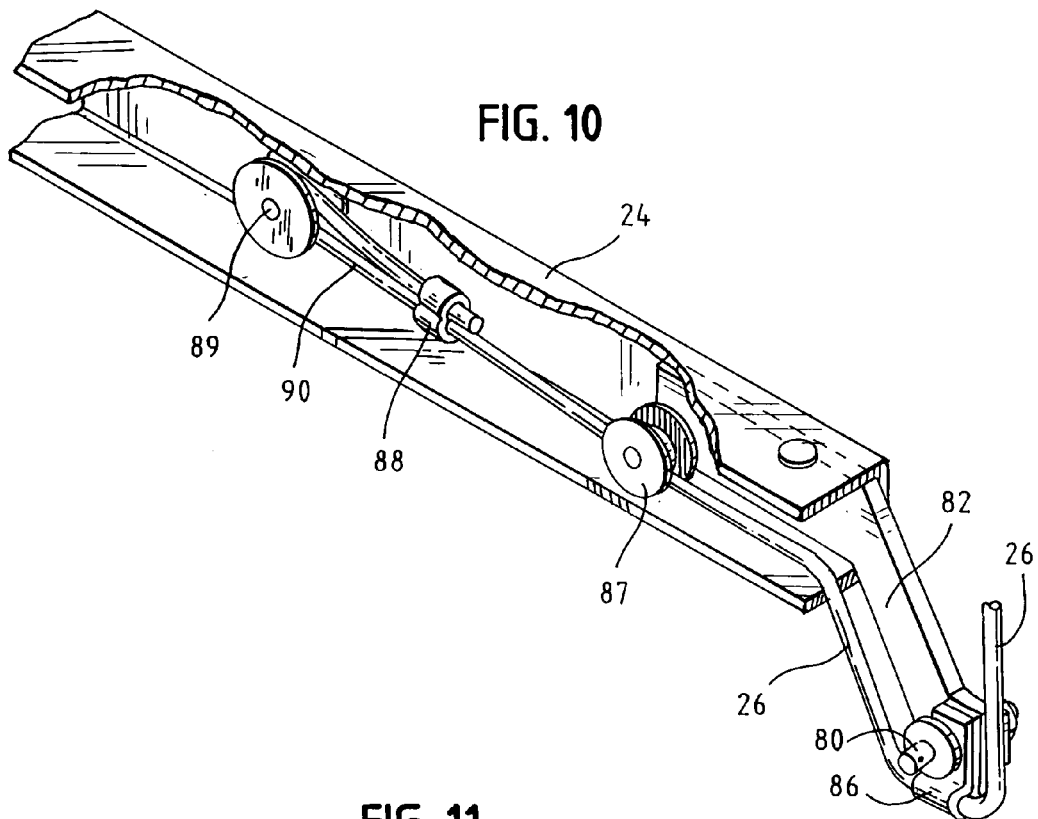
FIG. 10 is a fragmentary perspective view, with portions broken away, of a cable connection to a cross bar.
Figure 11:
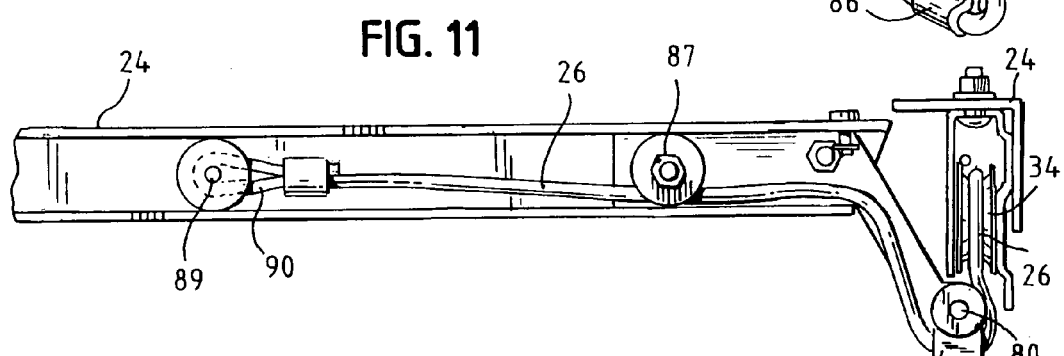
FIG. 11 is an elevational view of the cable connection and crossbar portion of FIG. 10.

Crossbars 24 are respectively connected with branching cable portions 26, that engage each crossbar 24 at an end thereof and may be connected to the crossbar as shown in FIGS. 10 and 11, or in any other desired, conventional way. These respective cable portions 26, in turn, join together, with several branching cable portions 26 on one side of compartment 11 joining together to form a main cable portion 28, as indicated in FIG. 6 and the diagrammatic FIG. 12. The respective vertically extending branch cable portions 26 are joined together with cable crimps or clamps 30, such as crimped oval sleeves, to form the horizontally extending main cable portion 28, after each respective branch cable portion 26 passes through a pulley 34, to provide a horizontally extending cable portion 35 which can be clamped to its neighbor cable portion, to form the overall, horizontally extending main cable portion 28. Thus, two of the main cable portions 28 in this embodiment comprise a horizontal assembly of extensions of the vertical branching cable portions 26, these horizontal assemblages being clamped together with crimps or clamps 30, as shown. Stationary frame support bars 32 and front bars 33, shown to be made of angled iron, or aluminum bars, are mounted at or near ceiling 15 of trailer compartment 11, as shown in FIG. 1, to carry the cable assembly 26, 28 through pulleys 34, as shown in FIGS. 1 and 6. Support bars 32 may be made from separate segments that are spliced together.

Figure 2:
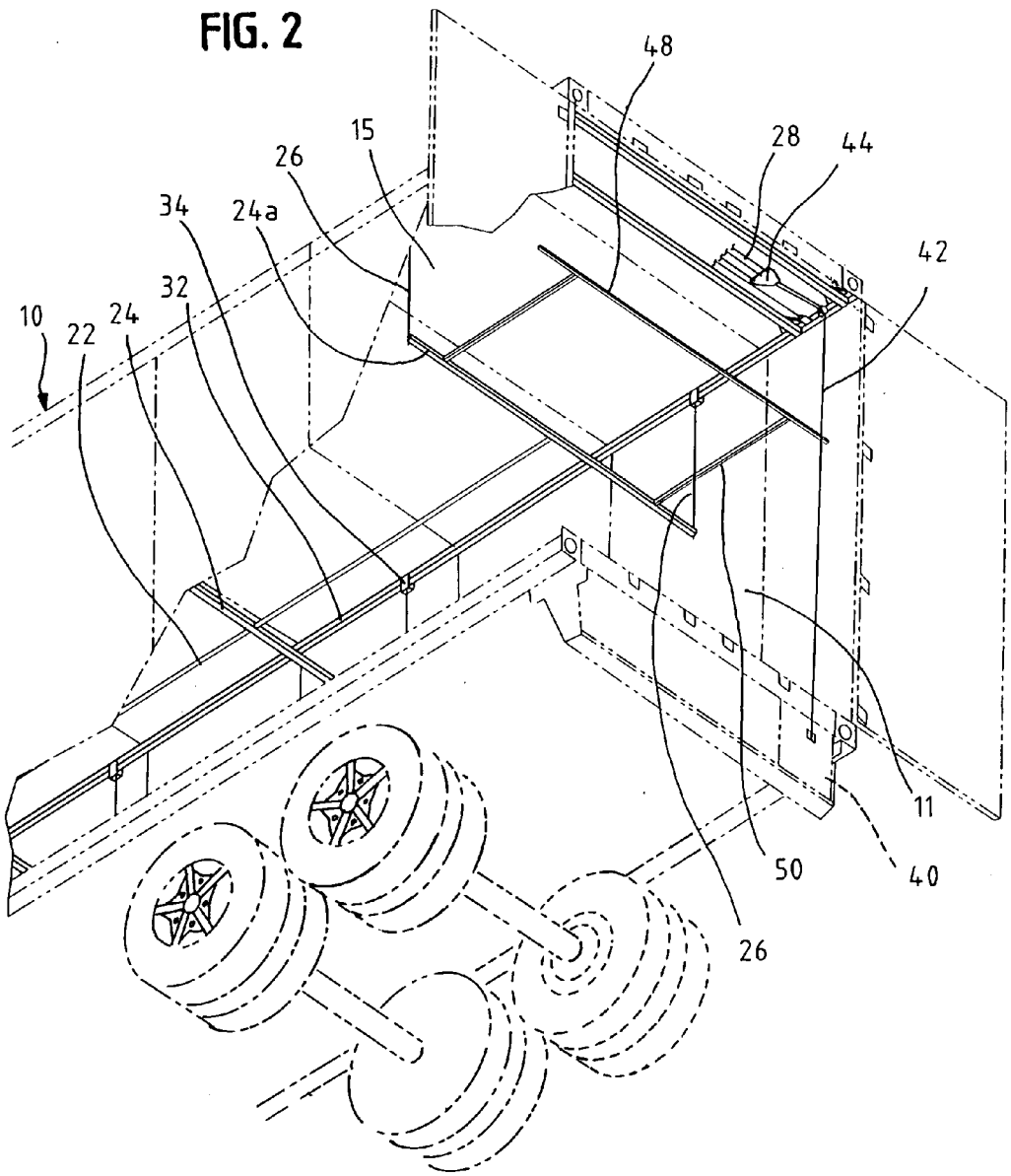
FIG. 2 is a bottom perspective view of the same truck trailer, with portions broken away and shown in dotted line.
Figure 3:
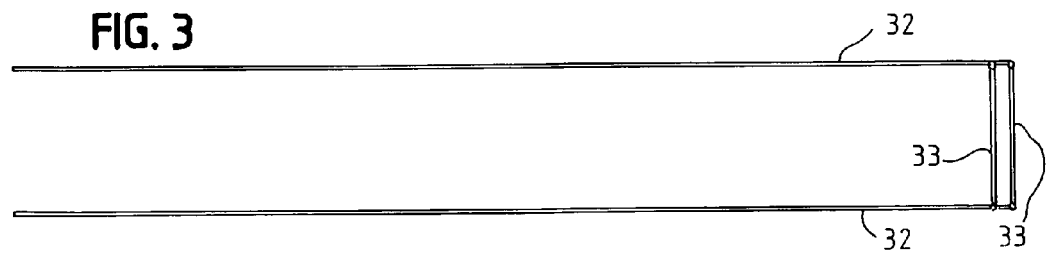
FIG. 3 is a plan view of a support portion of the cable system which is attached to and occupies the truck trailer of FIGS. 1 and 2, but is shown broken away from the trailer.
Figure 5:
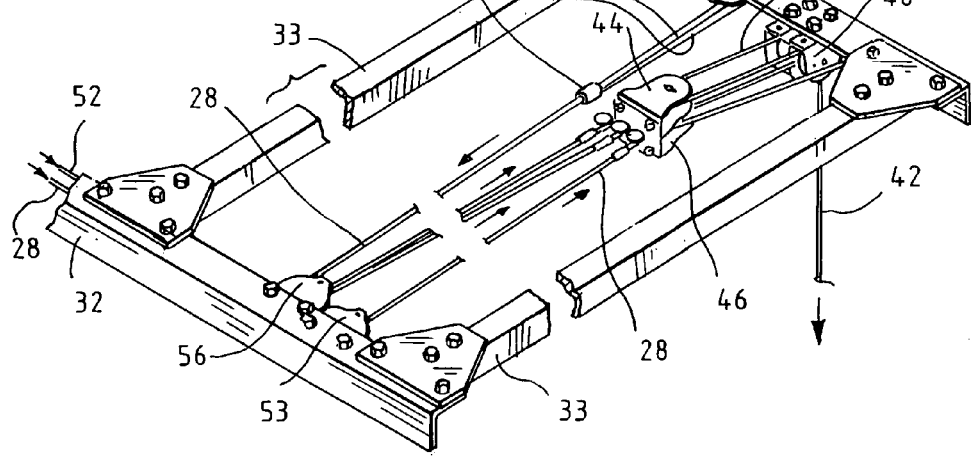
FIG. 5 is an enlarged, fragmentary, perspective view of one end of the support portion of the cable system.

These two main cable portions 28 connect, indirectly, to a winch 40, which may be mounted on a lower portion of the trailer, connecting with a master cable 42, which master cable, in turn, connects through multiple cable connector 44 to the respective main cable portions 28 on each side of compartment 11, as shown in FIGS. 1, 2 and 5. It can be seen that two other cable connections are present, to be discussed below.

If desired, master cable 42 may be threaded through a transverse pulley system comprising pulleys on connector 44 and pulleys 46 mounted on support bar 32, to provide a system of increased mechanical advantage, so that a lower power winch 40 may be used to elevate the cargo blanket suspension system 14, when that is desired for loading or unloading the truck or when not using the system. Then, the system can be lowered by running winch 40 in the opposite direction, so that cargo blanket 20 can descend onto a temperature sensitive cargo, and thus provide insulation from either heat or cold.

Length adjustment of framework 16 can be provided, without complete rebuilding, by the use of a frame extension, which comprises a cantilevered bar assembly 48, 50 attached to the crossbar 24a that is located at an end of framework 16, to extend the framework by an added distance (of substantially the length of longitudinal bars 50, and typically less than the average spacing between the respective crossbars 24, 24a.) Thus, one only needs to adjust the length of the longitudinal bars 50, in order to adjust the length of the frame 16 to accommodate a particular cargo enclosure 11. The bars may be of channel cross section, or any other shape.

As shown in FIG. 5, there are also a pair of added main cables 52, 54 which connect with connector 44 and thus connect with master cable 42. Cable 52 and cables 28 each run through one of a pair of horizontally mounted pulleys 53, 56, with pulley 56 carrying two cables. The main cable portion 28 which runs through pulley 53 then runs horizontally along angle support bar 32, which comprises part of the support framework. Added main cable portion 52 passes through pulley 56 in horizontal manner and also extends along angled bar 32, angling downwardly to form branching cable portion 58 (FIG. 4), and connecting to the forward cross bar 24a. This expediency of using extra cable 52 is done when there is insufficient room to permit a complete range of pulling of the cables between the elevated and the lowered position.

Figure 12:
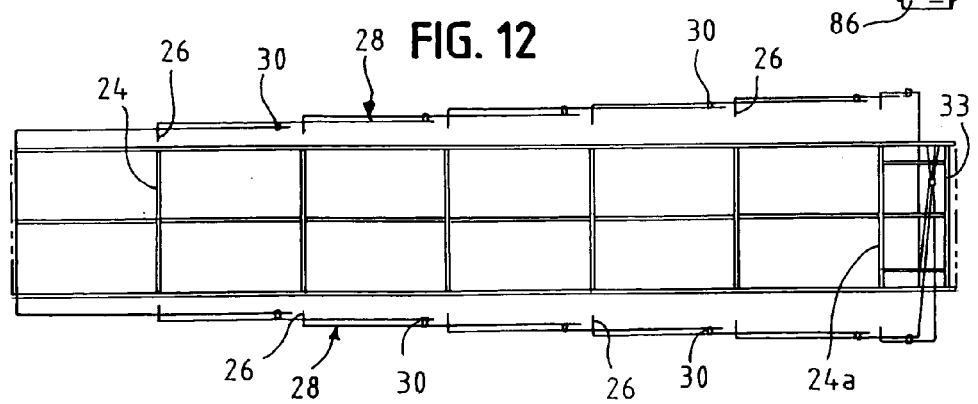
FIG. 12 is a diagrammatic view showing the assembly of main cable portions relative to the horizontal framework of connected bars and the cable suspension system.

The other main cable portion 28 also loops horizontally around pulley 56, and extends again transversely from angled support bar 32 toward the other angled support bar 32, where it meets horizontal pulley 60, directing it rearwardly within angled bar 32, into the branching cable configuration as illustrated in FIGS. 6 and 12.

Another main cable 54 (FIG. 5) is joined with the latter cable 28 at cable crimp 62, and branches outwardly to engage pulley 60, thus to also be directed horizontally along support bar 32 to the first cross bar 24a. There, it loops down a pulley like pulley 34, as do the branching cable portions 26, to define a cable portion 58a (FIG. 4) that connects to cross bar 24a, for the same purpose as cable portion 58.

Thus, when master cable 42 is pulled, the entire framework 16 and blanket 20 is raised, typically to engage the ceiling of compartment 11, with connector 44 moving toward pulleys 46. For lowering, master cable 42 is allowed to rise, causing connector 44 to move toward pulleys 53, 56.

Figure 9:
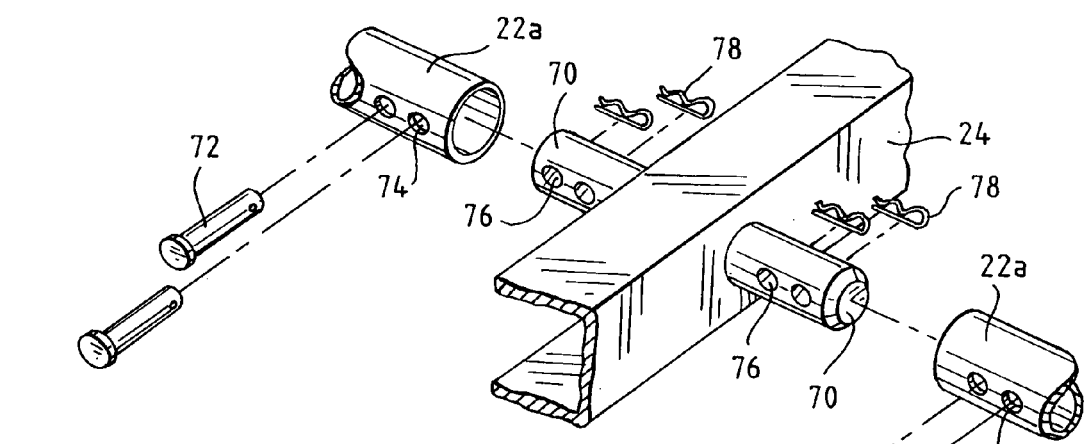
FIGS. 8 and 9 are detailed, exploded views of connections between respective portions of the suspension system.

Referring to FIG. 9, a detail of how longitudinal bar 22 can connect with the various cross bars 24 is shown. Longitudinal bar 22 comprises a series of tube sections 22a, while cross bars 24, 24a may comprise bar portions having studs 70 on each side to fit into the bores of the respective longitudinal bar portions 14a. Horizontal pins 72 can fit through the respective holes 74 of tubes 22a and one or two aligned holes 76 of studs 70, where they may be secured by clips 78. The pins are preferably horizontal to avoid interference and impact of the pin heads with fork lifts, which could snap off the heads.

Figure 8:
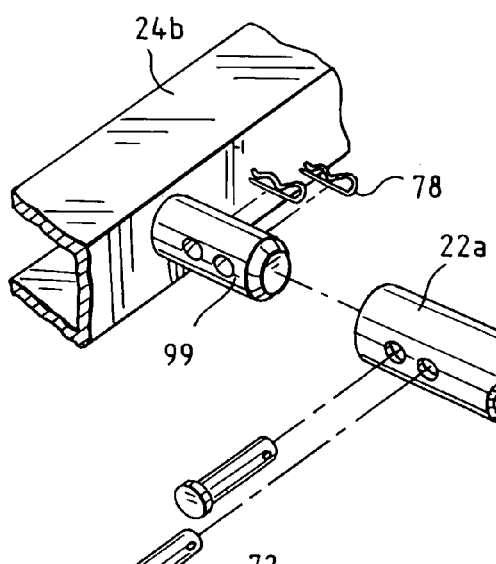

In a similar manner in FIG. 8, rear cross bar 24b has similar stubs 99, to telescopingly fit with longitudinally extending portion 22a of bar 22, being secured by pins 72 and clips 78, as in FIG. 9.

Referring to FIGS. 10 and 11, the attachment of branching cable portions 26 to the respective cross bars 24 at an end thereof is shown. Cable portion 26 extends vertically downwardly, and then bends about pin or bolt 80, which is carried at the bottom of a support arm 82, which, in turn, is attached to cross bar 24. Branching cable portion 26 extends through and is retained by loop strap 86, which is secured to cross bar 24 by bolt or pin 80. Cable 26 then extends and is laterally retained by washer 87, and is looped around pin 89 and crimped into a loop at crimp 88, forming a looped eyelet around bolt or pin 89. Bolt 89 then secures loop 90 by projecting through a hole in cross bar 24 for securance thereto.

When such a downwardly angled support arm 82 is used at the ends of at least most of cross bars 24, the entire framework 16 is elevated above bolts or pins 80, where the weight of the framework and quilt 20 is carried by branching cable portions 26 at bolts or pins 80, holding the entire array 16, 20 up toward the ceiling 15. This downward angle is preferably between about 15° and 60°, for example 45°. Variation of this angle can horizontally adjust the width of the system for use in different containers, such as trailer 10.

Figure 13:
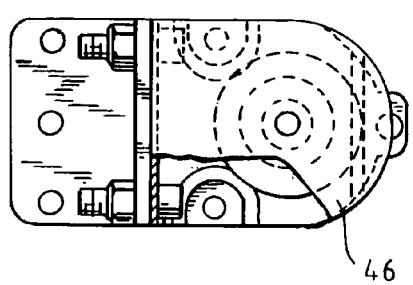
FIG. 13 is an elevational view of a pulley system shown in FIG. 5.
Figure 14:
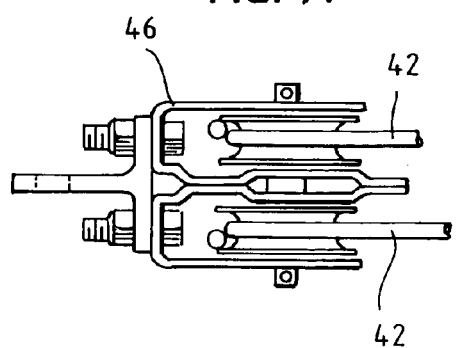
FIG. 14 is another view similar to that of FIG. 13, but rotated by 90°.

FIGS. 13 and 14 provide added details of double pulley 46.

Figure 7:
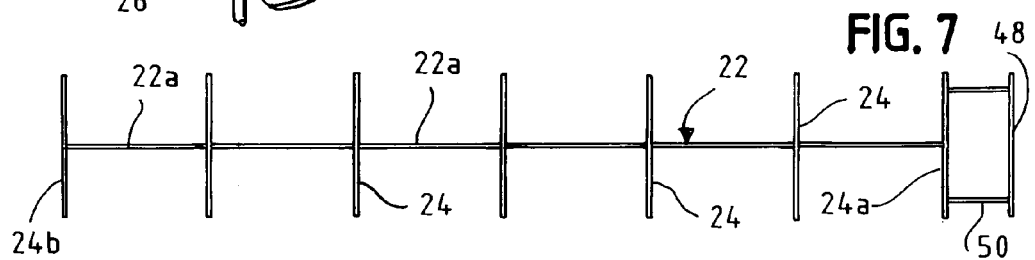
FIG. 7 is a broken-away, plan view of the generally flat, horizontal framework of connected bars.
Figure 15:
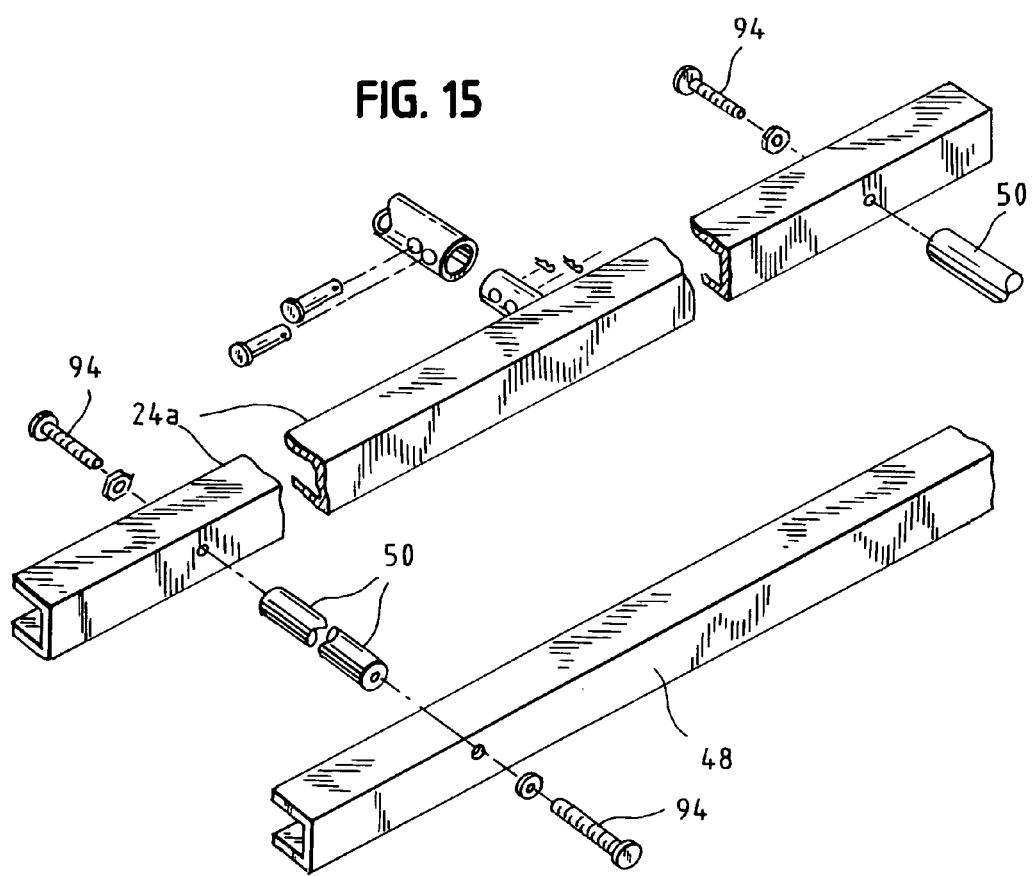
FIG. 15 is a fragmentary, exploded perspective view of a portion of the generally flat, horizontal framework of connected bars.

FIG. 15 shows the attachment of the cantilevered portion comprising joined bars 24a, 48, 50, (FIG. 7) and their connections to cross bar 24a. These connections relate to a connection utilizing bolts 94 secured to spacing tube bars 50.

Accordingly, a cargo blanket suspension system is provided for a cargo container, in which a blanket, such as a quilt, can be lowered on to the cargo for thermal insulation, but the blanket can be raised to be conveniently out of the way during loading and unloading, and when not needed.

The above is offered for illustrative purposes only, and is not intended to limit the scope of the invention of this application, which is as defined in the claims below.

The invention claimed is:

1. A cargo blanket suspension system for a container, which comprises:
   a generally flat, horizontal framework of connected bars positioned within a cargo compartment of said container; and
   a cable system connected to said framework of connected bars to suspend said framework from or adjacent to the ceiling of said cargo compartment, to support a cargo blanket carried on said framework, and to permit raising and lowering of said framework and cargo blanket within the cargo compartment.

2. The system of claim 1 in which a cargo blanket is carried on said framework.

3. The system of claim 1 in which said framework comprises at least one longitudinal bar extending most of the length of said cargo compartment, and a plurality of spaced, transversely extending cross bars attached to said longitudinal bar, said cross bars being attached to cable portions of the cable system.

4. The system of claim 3 in which said cable portions comprise branching cable portions that connect to at least one main cable portion, said main cable portion connecting to a winch, to permit raising and lowering of said frame with said winch and cable system.

5. The system of claim 4 in which at least a pair of main cable portions connect to said winch by attachment to a single master cable which is attached to said winch.

6. The system of claim 5 in which said master cable is threaded through a pulley system to gain mechanical advantage as the winch pulls the master cable to raise the framework and cargo blanket.

7. The system of claim 6 in which the master cable and main cable portions adjacent to the pulley system extend generally transversely of the length of the cargo compartment.

8. The system of claim 7 in which a frame extension, comprising a cantilevered bar assembly attached to a said cross bar located at an end of said framework, is present, to extend said framework by an added distance that is less than the average spacing between said cross bars.

9. The system of claim 6 in which downwardly angled support arms are attached at ends of the cross bars, said cable portions engaging said support arms at lower ends thereof to hold the cross bars at a level higher than the support arm lower ends.

10. The system of claim 3 in which downwardly angled support arms are attached at ends of the cross bars, said cable portions engaging said support arms at lower ends thereof to hold the cross bars at a level higher than the support arm lower ends.

11. The system of claim 3 in which a frame extension, comprising a cantilevered bar assembly attached to a said cross bar located at an end of said framework, is present, to extend said framework by an added distance that is less than the average spacing between said cross bars.

12. The system of claim 3 in which downwardly angled support arms are attached at ends of the cross bars, said cable portions engaging said support arms at lower ends thereof to hold the framework at a level higher than the support arm lower ends, and in which a frame extension, comprising a cantilevered bar assembly attached to a said cross bar located at an end of said framework, is present, to extend said framework by an added distance that is less than the average spacing between said cross bars.

13. The system of claim 12 in which said cable portions comprise branching cable portions that connect to at least one main cable portion, said main cable portion connecting to a winch, to permit raising and lowering of said framework with said winch and cable systems.

14. The system of claim 13 in which at least a pair of main cable portions connect to said winch by attachment to a single master cable which is attached to said winch.

15. The system of claim 14 in which said master cable is threaded through a pulley system to gain mechanical advantage as the winch pulls the master cable to raise the framework and cargo blanket.

16. The system of claim 15 in which the master cable and main cable portions adjacent to the pulley system extend generally transversely of the length of the cargo compartment.

17. The system of claim 16 in which a cargo blanket is carried on said framework, and comprises a quilt.

* * * * *